(12) United States Patent
Driver

(10) Patent No.: US 7,360,996 B2
(45) Date of Patent: Apr. 22, 2008

(54) WIND BLADE ASSEMBLY AND METHOD FOR DAMPING LOAD OR STRAIN

(75) Inventor: Howard D. Driver, Greer, SC (US)

(73) Assignee: General Electric Company, Schenectady, NY (US)

(*) Notice: Subject to any disclaimer, the term of this patent is extended or adjusted under 35 U.S.C. 154(b) by 251 days.

(21) Appl. No.: 11/295,467

(22) Filed: Dec. 7, 2005

(65) Prior Publication Data

US 2007/0128025 A1 Jun. 7, 2007

(51) Int. Cl.
*F03D 9/02* (2006.01)

(52) U.S. Cl. ............... 416/226; 416/40; 416/61; 416/500

(58) Field of Classification Search ........ 416/232, 416/226, 500, 61, 40; 188/266.7; 310/326
See application file for complete search history.

(56) References Cited

U.S. PATENT DOCUMENTS

| | | | |
|---|---|---|---|
| 4,155,252 A | | 5/1979 | Morrill |
| 4,518,888 A | * | 5/1985 | Zabcik ............ 310/334 |
| 4,834,610 A | | 5/1989 | Bond, III |
| 5,140,856 A | | 8/1992 | Larsen |
| 5,838,092 A | * | 11/1998 | Wang et al. ......... 310/326 |
| 5,857,694 A | | 1/1999 | Lazarus et al. |
| 5,961,080 A | | 10/1999 | Sinha |
| 6,127,739 A | | 10/2000 | Appa |
| 6,299,410 B1 | * | 10/2001 | Hilbert et al. ........ 416/145 |
| 6,465,901 B2 | | 10/2002 | Croes |
| 6,465,902 B1 | | 10/2002 | Beauchamp et al. |
| 6,769,873 B2 | | 8/2004 | Beauchamp et al. |
| 6,809,516 B1 | | 10/2004 | Li |
| 6,888,262 B2 | | 5/2005 | Blakemore |
| 2004/0152544 A1 | | 8/2004 | Lammer |

OTHER PUBLICATIONS

Peizoelectric Material; "PZTs Energize Active Composites NCC/ACI partnership to commercialize flexible lead zirconate titanate piezoelectric fibers in self-powered and 'smart' composite products"; High-Performance Composites; Jul. 2005; pp. 44-45.

* cited by examiner

*Primary Examiner*—Ninh H Nguyen
(74) *Attorney, Agent, or Firm*—Nixon & Vanderhye PC

(57) ABSTRACT

The transducers are incorporated in or laminated to wind blades and electrically connected to a self-powered electrical circuit. The transducers in combination with the self-powered electrical circuit improve the wind blades' response to changing wind conditions by reducing loads, at least until the turbines pitch axis system can alter the lie of the blades. Thus, when there is a change in wind conditions, the resultant twisting or bending of the wind blade during the impact of the wind (gust) on the wind blade is used to extract energy from the transducers. This energy is then transferred to the electrical circuit which in turn sends a signal back to the transducers to actuate them so as to resist the imposed load.

19 Claims, 7 Drawing Sheets

WIND BLADE ASSEMBLY AND METHOD FOR DAMPING LOAD OR STRAIN

BACKGROUND OF THE INVENTION

Piezoelectric materials can perform two desirable functions. When subjected to mechanical stress, e.g., bent, compressed or flexed, piezoelectric materials can generate an electric charge which can then be stored or used. Further, if an electric field is applied to a piezoelectric material, it can cause the piezoelectric material to deform.

A manufacturing process has been developed for making piezoelectric ceramic materials into flexible fibers. More specifically, Advanced Cerametrics Inc. (ACI) has created a flexible lead zirconate titanate (PZT) ceramic fiber capable of harvesting energy, actively controlling structures or powering electronic systems.

Piezoelectric fibers may be used in a "smart" sensor to sense the health of a structure or perform self-adjusting or vibration damping functions. In this regard, piezoelectric materials, such as ACI's PZT ceramic fibers, can be embedded into a composite material or attached to a structure's outside surface. Such an assembly takes advantage of the fiber's mechanical properties by first sensing a change a motion. This produces an electrical signal that can be sent to an electronic circuit. The electronic circuit can then relay a signal that either stiffens or relaxes the fibers, producing a self-adjusting or "smart" structure. For example, "smart" tennis rackets have been developed that use ACI's PZT fibers to actively damp vibrations. Transducers including piezoelectric fibers are provided on the racket frame to generate low-current electricity that is transmitted to an electronic circuit disposed in the racket's handle. The stored electric energy is released to flow back to the fibers which deform to counteract the vibration.

As is widely known, the largest part of the high stresses that tend to shorten the life span of a wind turbine will occur at high wind velocities. Wind turbines are conventionally equipped with measurement systems and control systems to enable them to independently react to changes in wind conditions. These systems are designed to maximize energy capture while minimizing the impact of fatigue and extreme loads. The effectiveness of these control systems is constrained by limitations on sensor technologies and the mechanical systems that control the pitch angle of the blades, the rotation of the rotor, and the like. In this regard, measurement systems and detectors local to the particular wind turbine necessarily operate in a reaction mode, reacting to conditions already existing at the wind turbine. The known approach of monitoring wind conditions and reducing the power output in case of high wind velocities makes it possible, for example, in a variable-speed pitch plant with a control algorithm for controlling the rotor speed and/or pitch angle to obtain high ratios between the rotor diameter and the generator performance without an accompanying increase in component fatigue.

BRIEF DESCRIPTION OF THE INVENTION

Blade weight and hence Cost of Energy (COE) are dependent on the severity of extreme loads applied to the turbine structure by winds that are too strong to be totally converted to electricity. The excess load must be mitigated or the structure must be designed to sustain it. Conventional pitch axis systems provide load relief to the structure in sustained high wind speed conditions, but their reaction rate is slow. Thus, the invention proposes to reduce loads by active damping, provide blade stress-strain feedback for active control to reduce loads, and/or to provide live data on the stresses and condition of the blade. According to an example embodiment of the invention, piezoelectric fibers are incorporated into or mounted onto wind turbine blade structures so as to sense and oppose unwanted vibrations and deformations. In addition, or in the alternative, information provided by the piezoelectric fibers is used to augment active control strategies and/or to provide live data on the stresses and condition of the respective blade.

Thus, the invention may be embodied in a wind turbine blade assembly comprising: a plurality of blades mounted on a hub; each said blade including a piezoelectric damping system comprising at least one transducer assembly one of incorporated in or mounted to said blade and at least one circuit located within or mounted to said blade and electrically connected to said at least one transducer assembly, said circuit including at least one storage element configured to store power extracted from at least one said transducer assembly; and wherein stored power is supplied back to at least one said transducer assembly, and said transducer assembly converts said electrical power to mechanical power, said mechanical power being adapted to actively stiffen said blade.

The invention may also be embodied in a method for damping load or strain in the blades of a wind turbine blade assembly comprising a plurality of blades mounted on a hub, comprising: incorporating a piezoelectric damping system in or on each said blade, said piezoelectric damping system including at least one transducer assembly and at least one circuit electrically connected to said at least one transducer assembly, said circuit including at least one storage element configured to store power extracted from at least one said transducer assembly; storing power extracted from at least one said transducer assembly with said storage element; supplying said stored power back to at least one said transducer assembly; and converting said electrical power to mechanical power to actively stiffen said blade.

BRIEF DESCRIPTION OF THE DRAWINGS

These and other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
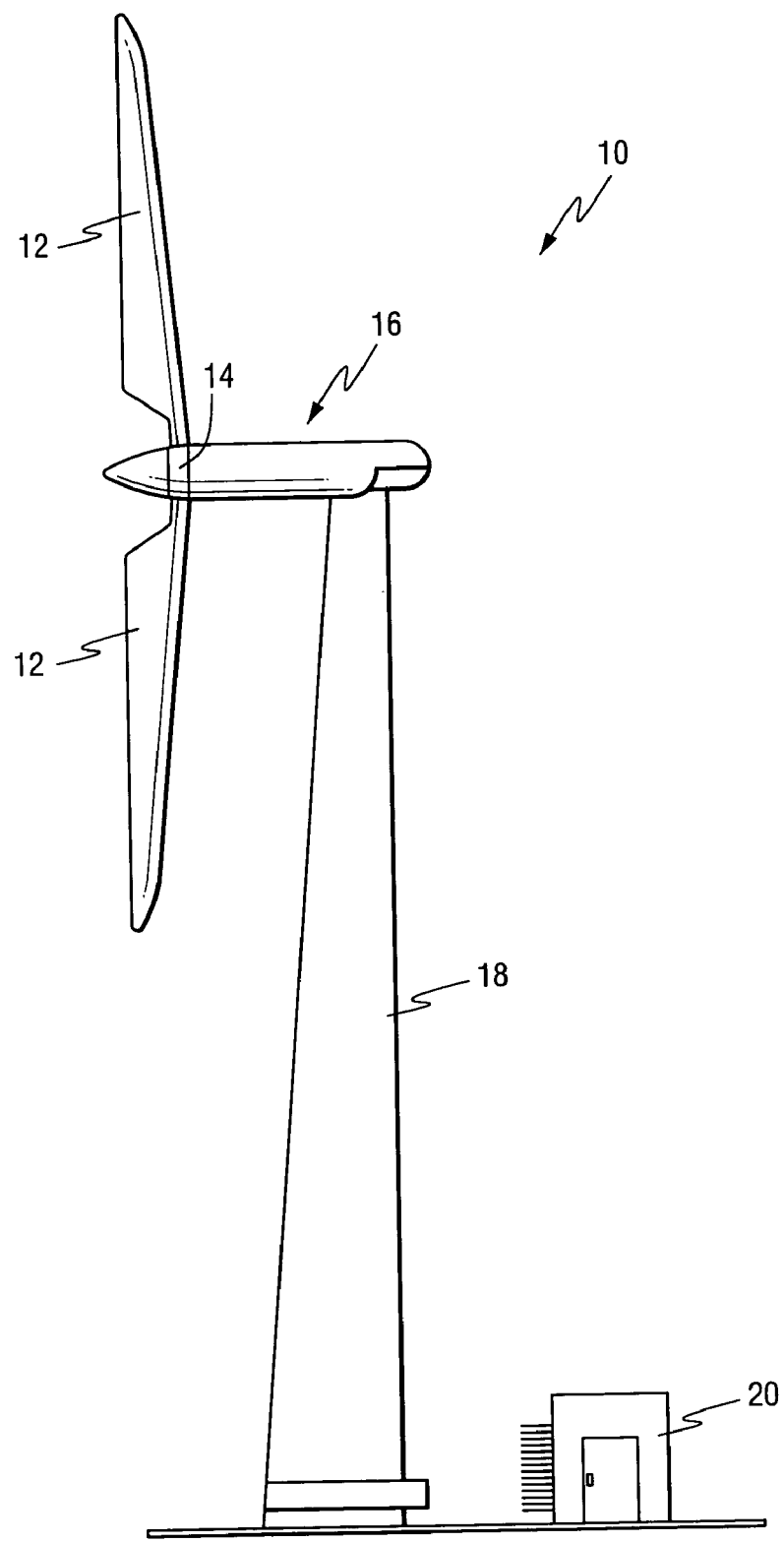
FIG. 1 is a side elevational view of a wind turbine assembly.

A wind turbine is schematically illustrated in FIG. 1. The turbine 10 generally includes a plurality of wind blades 12, for example two or three blades, attached to a hub 14. The blades are lightweight but stiff to reduce wind gusts. The blades may employ aerodynamic controls such as ailerons or windbrakes (not shown) to control speed. The hub is connected to a drive train (not shown) that may be flexible to minimize structural loads. This mechanism is connected to an electric generator 16. The entire mechanism is disposed on a tower structure 18 for exposure to stronger winds. A control room 20 is located at or near the turbine 10 and includes, or is operatively coupled to, a control computer to monitor wind conditions as well as current configurations and speed of the blades as detected by sensors (not shown in detail) provided on or associated with the turbine, and to implement control strategies.

Conventional pitch axis control has the ability to rotate the wind blades downward, thus reducing the angle of attack to reduce the blade forces in a rising wind condition. A problem with this type of system is that the pitch motors are slow to react and turn the wind blades to the desired position. While pitch axis control does work and is widely used in the wind turbine industry, it does not reduce blade loads as much as it would if it could act instantaneously.

In an example embodiment of the invention, piezoelectric fibers are incorporated in or provided on the wind blade to form "smart blades" to provide active damping to minimize the wind blade's first response to changing wind conditions, to effectively buy time by reducing blade loads until the conventional pitch axis control system can catch up with the changing conditions. Thus, the piezoelectric fibers are used to reduce the load by returning the electric current produced by the fibers back to the same fibers or fibers in an adjacent transducer with the correct timing so as to oppose the force that is, e.g., bending or twisting the blade. Thus, the invention provides a secondary control system with nearly instantaneous response to augment and extend the capability of the primary (pitch axis) control system which is slow but effective and reliable.

Thus, as described in greater detail and by way of illustrated examples below, in example embodiments the wind blades of a wind turbine are provided with a self-powered damping system comprised of at least one transducer assembly mounted to or incorporated in the blade, said at least one transducer assembly converting upon deformation mechanical energy to electrical energy and an electrical circuit connected to the transducer. In a first example embodiment, described in greater detail below with reference to FIG. 5, the electrical circuit supplies energy or power to the transducer, wherein all electrical energy or power supplied to the transducer is derived from energy extracted from the mechanical deformation. The transducer converts the electrical energy to mechanical energy to resist e.g. the load applied to the wind blade by a wind gust.

Figure 2:
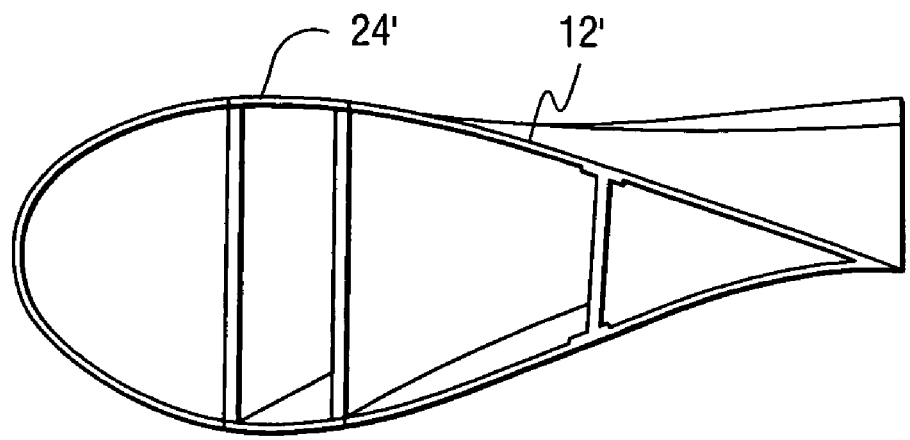
FIG. 2 is a schematic cross-section of an example wind blade.
Figure 3:
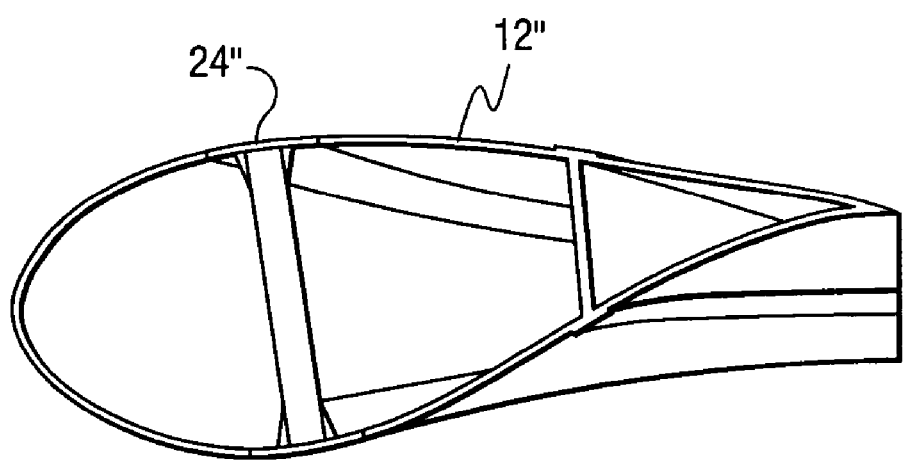
FIG. 3 is another schematic cross-section of another example wind blade.
Figure 4:
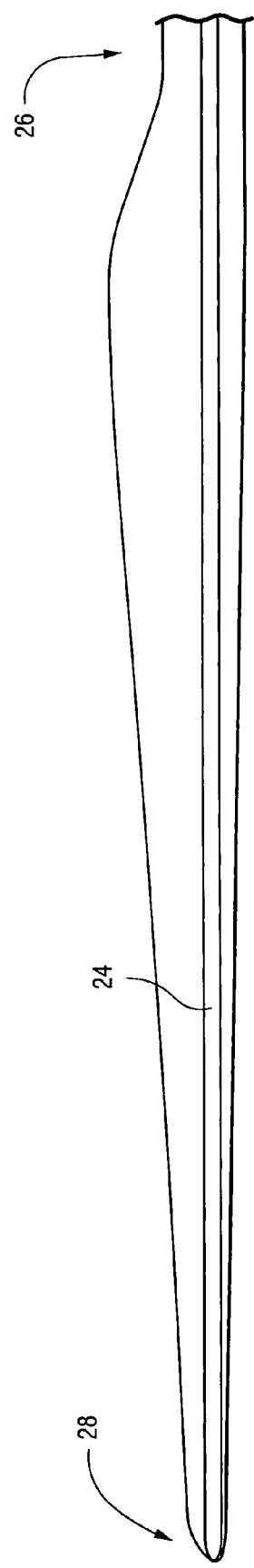
FIG. 4 is a plan view of a wind blade.

FIGS. 2 and 3 illustrate typical blade cross-sections of blades 12', 12" in which the invention may be implemented. As illustrated, the blades include load bearing spar caps 24', 24" which extend generally the length of the blade from the blade root 26 to the tip 28. FIG. 4 is a plan view of a blade 12 illustrating a typical blade configuration and depicting the load bearing spar cap 24 of the visible blade surface.

Figure 5:
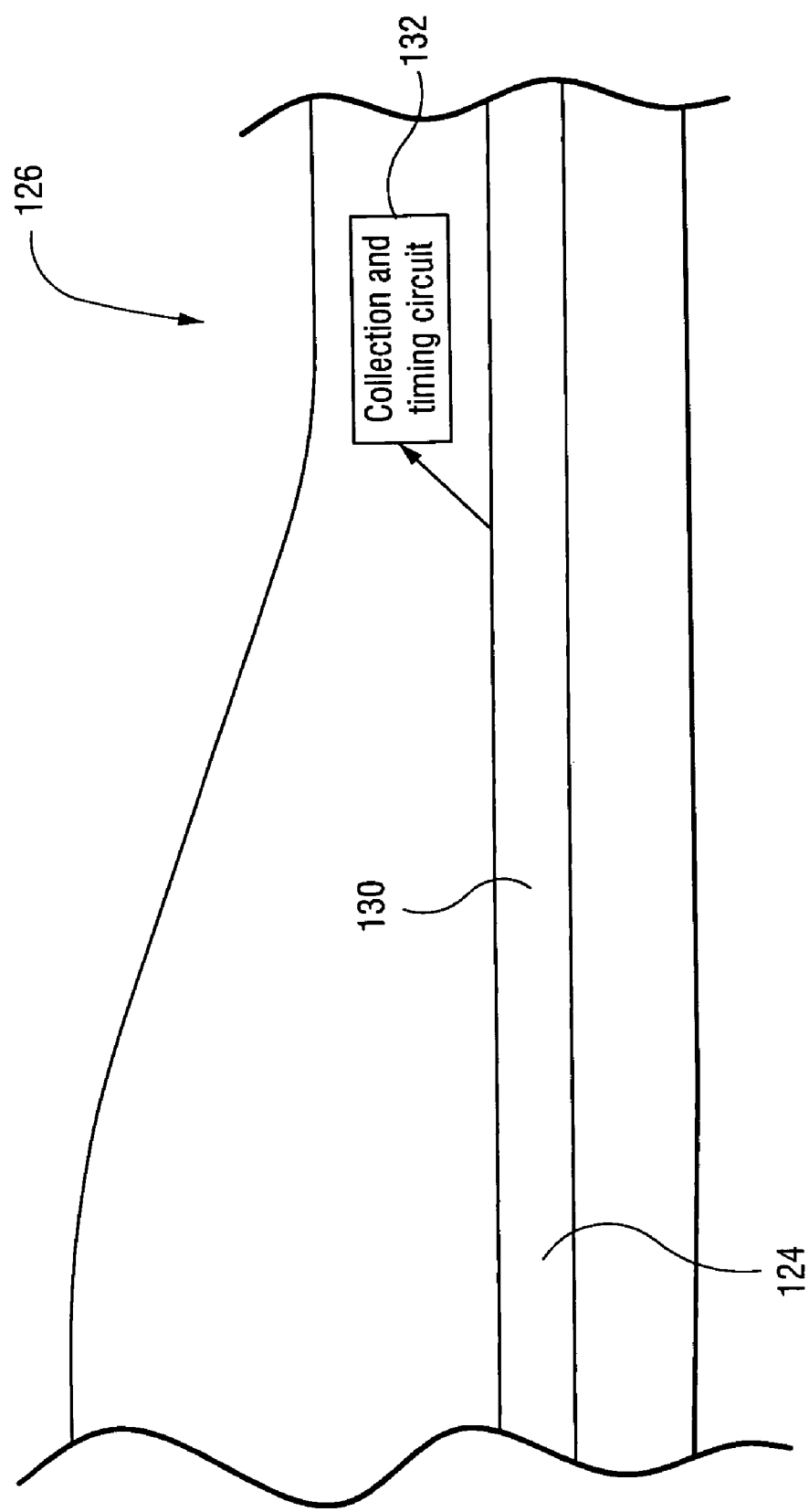
FIG. 5 is a schematic illustration of a blade root illustrating a first example embodiment of the invention.

FIG. 5 is an enlarged schematic illustration of the blade root portion 126 in a first example embodiment of the invention. The at least one transducer is incorporated in or mounted to a region of the wind blade where maximum deformation occurs during the use of the wind blade. More particularly, this region lies on the front surface and/or its opposite back surface of the wind blade, generally at or in the vicinity of the spar caps 124 since maximum deformation can be expected there. In the schematic illustration of FIG. 5, the transducer (schematically labeled with reference number 130) is incorporated in the spar cap structure 124. Even as such, one or a plurality of discrete transducers can be provided along a portion or portions of or along the entire blade. The transducers may be provided on one or both sides of the wind blade. Moreover, more transducers may be stacked on each side to improve performance of the wind blade.

In an example embodiment, the transducer 130 is a composite for actuating or sensing deformation of a structural member comprising a series of flexible, elongated fibers arranged in a parallel array. Each fiber is substantially in parallel with each other, with adjacent fibers being separated by a relatively soft deformable polymer having additives to vary the electric or elastic properties of the polymer. In this example, the composite further includes flexible conductive electrode material along the axial extension of the fibers for imposing or detecting electric fields. In this example, the fibers are electro-ceramic fibers comprising a piezoelectric material. This type of transducer is described in more detail in U.S. Pat. No. 5,869,189 and U.S. application Ser. No. 09/918,437, the disclosures of each of which are incorporated herein by this reference.

In the alternative, transducers incorporating piezoelectric fibers may be provided on the surface(s) of the spar caps 124 or elsewhere in or on the blade convenient for providing actuation in the bending mode. In an example embodiment, the at least one transducer laminated to the wind blade frame comprises silver ink screen-printed interdigitated electrodes (IDE) on polyester substrate material, unidirectionally aligned PZT-5A lead based piezoelectric fibers and thermoset resin matrix material.

Example transducers are described in and U.S. Pat. No. 5,869,189 and U.S. application Ser. No. 09/918,437, which disclosure is incorporated herein by this reference. A commercially available transducer which may be used with the present invention is an active fiber composite ply known as "Smart Ply" (Continuum Control Corporation, Billerica, Mass., U.S.A.).

As already mentioned above, the transducers have a two-fold purpose of sensing and actuating. They are used to sense strain in the wind blade and provide an electrical output via an electrode subsystem to the electrical circuit. They are also used to actuate the wind blade once motion deformation has been detected. In fact, the piezoelectric fibers are transducers and convert mechanical deformation into electrical energy and vice versa. When deformed, they develop a surface charge and, conversely, when an electric field is applied, a deformation is induced. The mechanical strains in the wind blade due to wind impact deform the transducer, straining the piezoelectric fibers. The interdigitated electrode picks up the surface charges developed by the strained piezoelectric fibers and provides an electric path for the charges to be routed to an appropriate electrical circuit. Conversely, the interdigitated electrode also provides the electrical path to drive the piezoelectric fibers in the transducer to counter the vibrations induced in the wind blade by wind impact.

As mentioned above, according to example embodiments of the invention, electric and/or magnetic fields are used to transfer energy into and out of the piezoelectric fibers. As schematically illustrated in FIG. 5, in this example embodiment, the energy coming from the piezoelectric fibers upon exercise of the blade is collected near the root of the blade. A device 132 there stores the energy coming from the piezoelectric fibers and selectively releases the energy with a timing to oppose the load, temporarily, while the blade pitch control system is actuated to re-orient the wind blades to reduce loads. When more than one transducer is used, the transducers may all be electrically connected to the same electrical circuit. In accordance with an embodiment, this connection is established by means of a so-called flex circuit which can be laminated to or incorporated in the frame of the wind blade. The electrical circuit, which optimally comprises a storage element for storing power extracted from the at least one transducer, may advantageously be provided in the root of the wind blade.

The electrical circuit used with the wind blade of the present invention may be a self-powered, i.e. no external energy source like a battery is necessary. The electrical circuit presently proposed therefor comprises a printed wiring board (PWB) populated with active and passive components using standard surface mount technology (SMT) techniques. The components of the electrical circuit may include, inter alia, high-voltage MOSFETs, capacitors, resistors, transistors and inductors. The purpose of the electrical circuit or electronics board is to extract the charge from the transducer actuators, temporarily store it, and re-apply it in such a way as to reduce or damp the load or strain on the wind blade. Example embodiments of the electrical circuit are described in detail in U.S. application Ser. No. 09/918, 437 and incorporated herein by this reference.

As described above, one way in which the piezoelectric fibers may be used is using the electrical impulse that comes from the exercised blade (without additional power from the system) to work against the direction of loading. In an alternate embodiment, impulses can be fed into the system's control computer and return a signal to the blade that is timed, amplified and sustained for whatever period of time is required to keep the load or a strain level below a prescribed limit and allow the pitch axis system to catch up. These approaches are described more specifically below with reference to FIGS. 6 and 7.

The latter approach is particularly effective because it allows the blade maximum loads to be defined and ensures that they are not exceeded. The extra supply of power allows greater mitigation and longer action against the forces that are being applied by the wind. In this regard, the embedded piezoelectric fibers can be considered analogous to human muscle. If someone tries to bend an arm out of position, the muscle is used to oppose this force thereby preventing damage to the arm.

Figure 6:
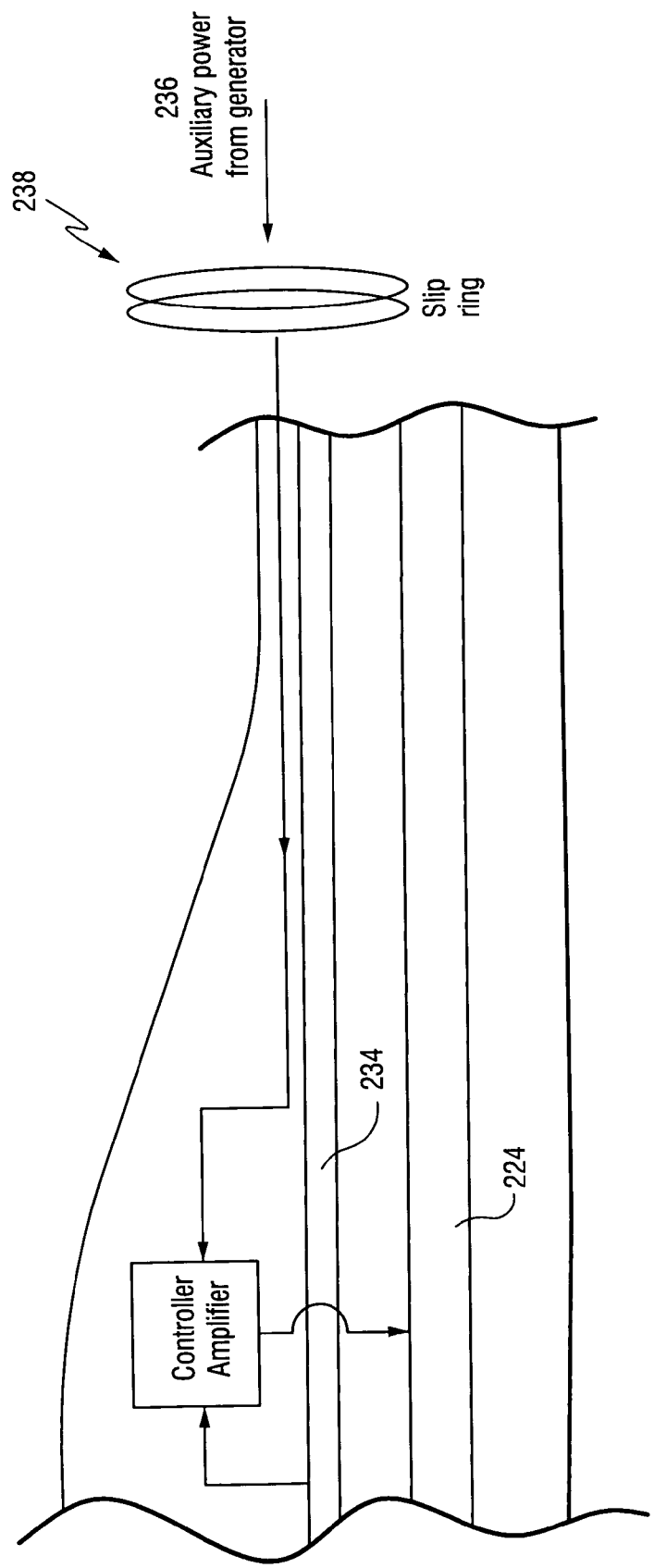
FIG. 6 is a schematic illustration of a blade root illustrating a second example embodiment of the invention.

Referring now more specifically to a second example embodiment, depicted in FIG. 6, a separate strip 234 incorporating piezoelectric fibers such as PZT fibers or fiber optic bragg gratings, or another suitable sensor is placed to extend along side or on top of the spar cap 224. In this example embodiment, as mentioned above, additional power 236 may be selectively brought into the blade root area through a slip ring 238. This additional energy can be used to amplify and/or potentate, via circuit 232, the signal from the sensor strip 234 to provide a strong and ongoing opposition to the bending caused by the wind.

Figure 7:
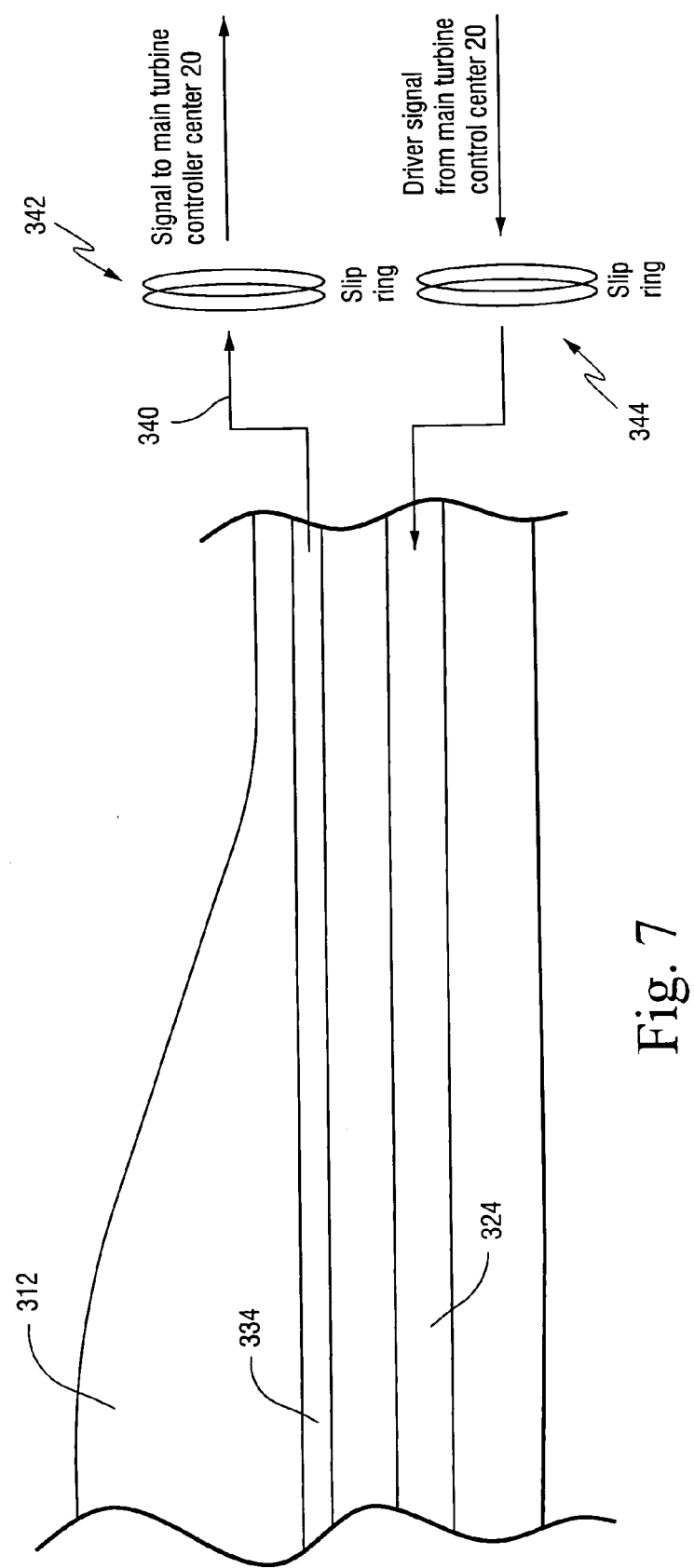
FIG. 7 is a schematic illustration of a blade root illustrating a third example embodiment of the invention.

Yet a further example embodiment is schematically illustrated in FIG. 7. In this embodiment, the signal 340 coming from the sensor strip 334 disposed adjacent to or on the spar cap 324 is brought out of the blade through its own slip ring 342 to the turbine main control center 20. There the signal is processed for the appropriate response back to a transducer in or on the spar cap 324 through a separate slip ring 344. Thus, this embodiment includes piezoelectric fibers in or on the spar cap 324 and in the sensor strip 334, but the fibers of the spar cap are used for resisting load not for a sensing function. In a similar manner two types of transducers can be provided in the FIG. 5 and FIG. 6 example embodiments, one for sensing movement and generating electrical energy therefrom, and the other for selectively receiving that electrical energy from the electrical circuit to respond to, e.g. resist, the movement.

According to yet a further example embodiment, the signal coming from the sensor strip is used for additional functions such as, but not limited to, interaction with the blade pitch control system. Thus, the blade load management would be an integration of the blade sensor and spar cap actuator into the total control system of the turbine.

Figure 8:
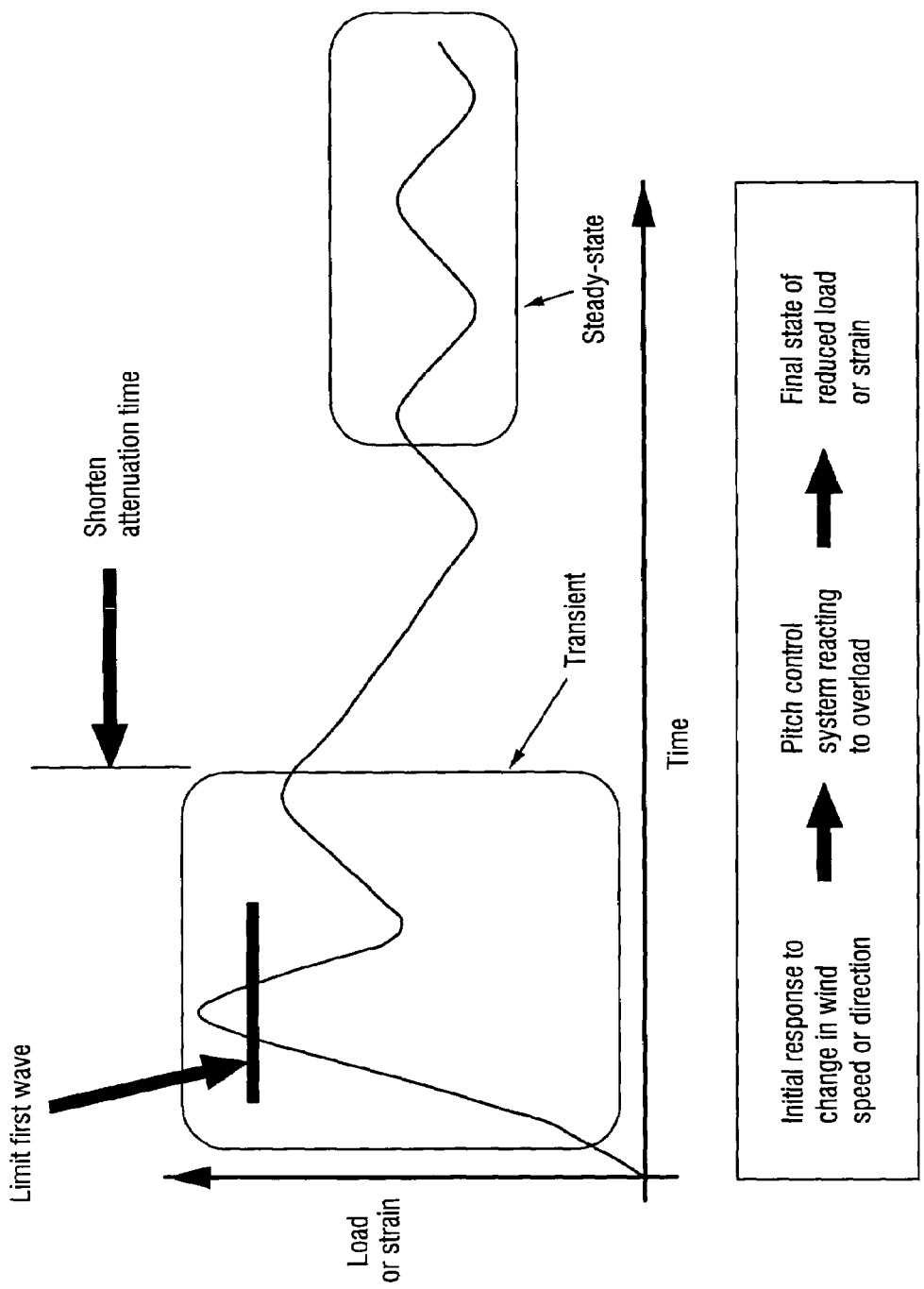
FIG. 8 is a schematic representation showing how active load or strain damping with piezoelectric fibers according to an example embodiment of the invention limits the first wave of the response in a typical pitch axis control system.

Referring to the schematic illustration of FIG. 8, when the blade is shocked by a change in wind conditions, particularly increased wind speed, its load or its strain increases in a transient response. In the schematic representation of FIG. 8, the curve shows a response in a typical pitch axis control system. The arrows and associated lines show how active damping with piezoelectric fibers according to an example embodiment of the invention limits the first wave of the response and shortens the time for the shock to attenuate. Thus, as mentioned above, providing piezoelectric fibers according to the invention reduces the instantaneous response and effectively "buys time" for the pitch axis system to come into play. When maximum loads are reduced in this manner, the blade can be of a lighter design or it can be used in higher rated wind sites.

It is to be noted that the piezoelectric fibers provided according to an example embodiment of the invention are not provided to manipulate the shape of the blade so as to change the aerodynamic impact of wind on the blade so as to reduce the force of the wind in the first instance. In an example embodiment of the invention, while the fibers influence bending of the blade, e.g. resist or reduce bending of the blade, bending per se has a negligible impact on aerodynamics and does not lessen the force of the wind. The piezoelectric fibers according to the invention enable the blade to push back when it is pushed on by the wind. This lessens the strain in the blade without lessening the force of the wind. The embodiments described with reference to FIGS. 5, 6 and 7 each successively gives the system more power and more interaction with the whole wind control system.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A wind turbine blade assembly comprising:
 a plurality of blades mounted on a hub;
 each said blade including a piezoelectric damping system comprising at least one transducer assembly one of incorporated in or mounted to said blade and at least one circuit located within or mounded to said blade and electrically connected to said at least one transducer assembly, said circuit including at least one storage element configured to store power extracted from at least one said transducer assembly;

wherein stored power is supplied back to at least one said transducer assembly, and said transducer assembly converts said electrical power to mechanical power, said mechanical power being adapted to actively stiffen said blade, and wherein the blade includes a spar cap on forward and rearward facing surfaces thereof, and wherein at least one of the transducer assemblies is located at the forward facing spar can area.

2. A wind turbine blade assembly as in claim 1, wherein said piezoelectric damping system is a self-powered system, wherein all electrical power supplied to the at least one transducer assembly is derived from power extracted from mechanical deformation of the blade.

3. A wind turbine blade assembly as in claim 1, wherein at least one of the transducer assemblies is located adjacent to and generally parallel to the forward facing spar cap area.

4. A wind turbine blade assembly as in claim 1, wherein at least one said transducer assembly includes piezoelectric fibers.

5. A wind turbine blade assembly as in claim 1, further comprising an electrical power supply for augmenting said stored power.

6. A wind turbine blade assembly as in claim 1, further comprising a control computer operatively coupled to said circuit for sending commands to said circuit.

7. A wind turbine blade assembly as in claim 6, further comprising an electrical power supply for augmenting said stored power.

8. A wind turbine blade assembly as in claim 6, further comprising a wind sensor joined to said control computer to measure current wind conditions and provide such to said control computer; and sensors adapted to determine current configurations and speed of said blades and provide such to said control computer; and wherein said control computer commands an actuator to reconfigure said blades for optimum performance under current wind conditions.

9. A method for damping load or strain in the blades of a wind turbine blade assembly comprising a plurality of blades mounted on a hub, comprising:

incorporating a piezoelectric damping system in or on each said blade, said piezoelectric damping system including at least one transducer assembly and at least one circuit electrically connected to said at least one transducer assembly, said circuit including at least one storage element configured to store power extracted from at least one said transducer assembly;

storing power extracted from at least one said transducer assembly with said storage element;

supplying said stored power back to at least one said transducer assembly; and converting said electrical power to mechanical power to actively stiffen said blades, wherein the blade includes a spar cap on forward and rearward facing surfaces thereof, and wherein at least one of the transducer assemblies is located adjacent to and generally parallel to the forward facing spar cap area.

10. A method as in claim 9, wherein said piezoelectric damping system is a self-powered system, wherein all electrical power supplied to the at least one transducer assembly is derived from power extracted from mechanical deformation of the blade.

11. A method as in claim 9, wherein a first said transducer assembly is located in or on the forward facing spar cap area and wherein a second said transducer assembly is located adjacent to and generally parallel to the forward facing spar cap area, and wherein said circuit stores energy derived from one of said transducer assemblies and supplies at least some of said energy to the other of said transducer assemblies.

12. A method as in claim 9, wherein at least one said transducer assembly includes piezoelectric fibers.

13. A method as in claim 9, further comprising augmenting said stored power with electrical energy from an electrical power supply.

14. A method as in claim 13, wherein said electrical power supply is located remote from said blade.

15. A method as in claim 9, further comprising sending commands to said circuit from a control computer located remote from said blade and operatively coupled to said circuit.

16. A method as in claim 15, further comprising augmenting said stored power with electrical energy from an electrical power supply.

17. A method as in claim 15, further comprising:

measuring current wind conditions and providing such to said control computer; and determining current configurations and speed of said blades and providing such to said control computer;

wherein said control computer commands an actuator to reconfigure said blades for optimum performance under current wind conditions; and wherein said supplying said stored power and converting said electrical power to mechanical power to actively stiffen said blade is terminated once said blades have been reconfigured.

18. A wind turbine blade assembly comprising:

a plurality of blades mounted on a hub;

each said blade including a piezoelectric damping system comprising at least one transducer assembly one of incorporated in or mounted to said blade and at least one circuit located within or mounded to said blade and electrically connected to said at least one transducer assembly, said circuit including at least one storage element configured to store power extracted from at least one said transducer assembly;

wherein stored power is supplied back to at least one said transducer assembly, and said transducer assembly converts said electrical power to mechanical power, said mechanical power being adapted to actively stiffen said blade, further comprising a control computer operatively coupled to said circuit for sending commands to said circuit;

a wind sensor joined to said control computer to measure current wind conditions and provide such to said control computer, sensors adapted to determine current configurations and speed of said blades and provide such to said control computer; and wherein said control computer commands an actuator to reconfigure said blades for optimum performance under current wind conditions.

19. A method for damping load or strain in the blades of a wind turbine blade assembly comprising a plurality of blades mounted on a hub, comprising:

incorporating a piezoelectric damping system in or on each said blade, said piezoelectric damping system including at least one transducer assembly and at least one circuit electrically connected to said at least one transducer assembly, said circuit including at least one storage element configured to store power extracted from at least one said transducer assembly;

storing power extracted from at least one said transducer assembly with said storage element;

supplying said stored power back to at least one said transducer assembly; and converting said electrical power to mechanical power to actively stiffen said blade;

further comprising sending commands to said circuit from a control computer located remote from said blade and operatively coupled to said circuit;

measuring current wind conditions and providing such to said control computer; and determining current configurations and speed of said blades and providing such to said control computer;

wherein said control computer commands an actuator to reconfigure said blades for optimum performance under current wind conditions; and wherein said supplying said stored power and converting said electrical power to mechanical power to actively stiffen said blade is terminated once said blades have been reconfigured.

* * * * *

UNITED STATES PATENT AND TRADEMARK OFFICE
CERTIFICATE OF CORRECTION

PATENT NO.       : 7,360,996 B2                                   Page 1 of 1
APPLICATION NO.  : 11/295467
DATED            : April 22, 2008
INVENTOR(S)      : Driver It is certified that error appears in the above-identified patent and that said Letters Patent is hereby corrected as shown below:

At column 7 line 9 change the phrase "spar can area" to the phrase --spar cap area--

Signed and Sealed this

Twelfth Day of August, 2008

JON W. DUDAS
*Director of the United States Patent and Trademark Office*